Figure 1:
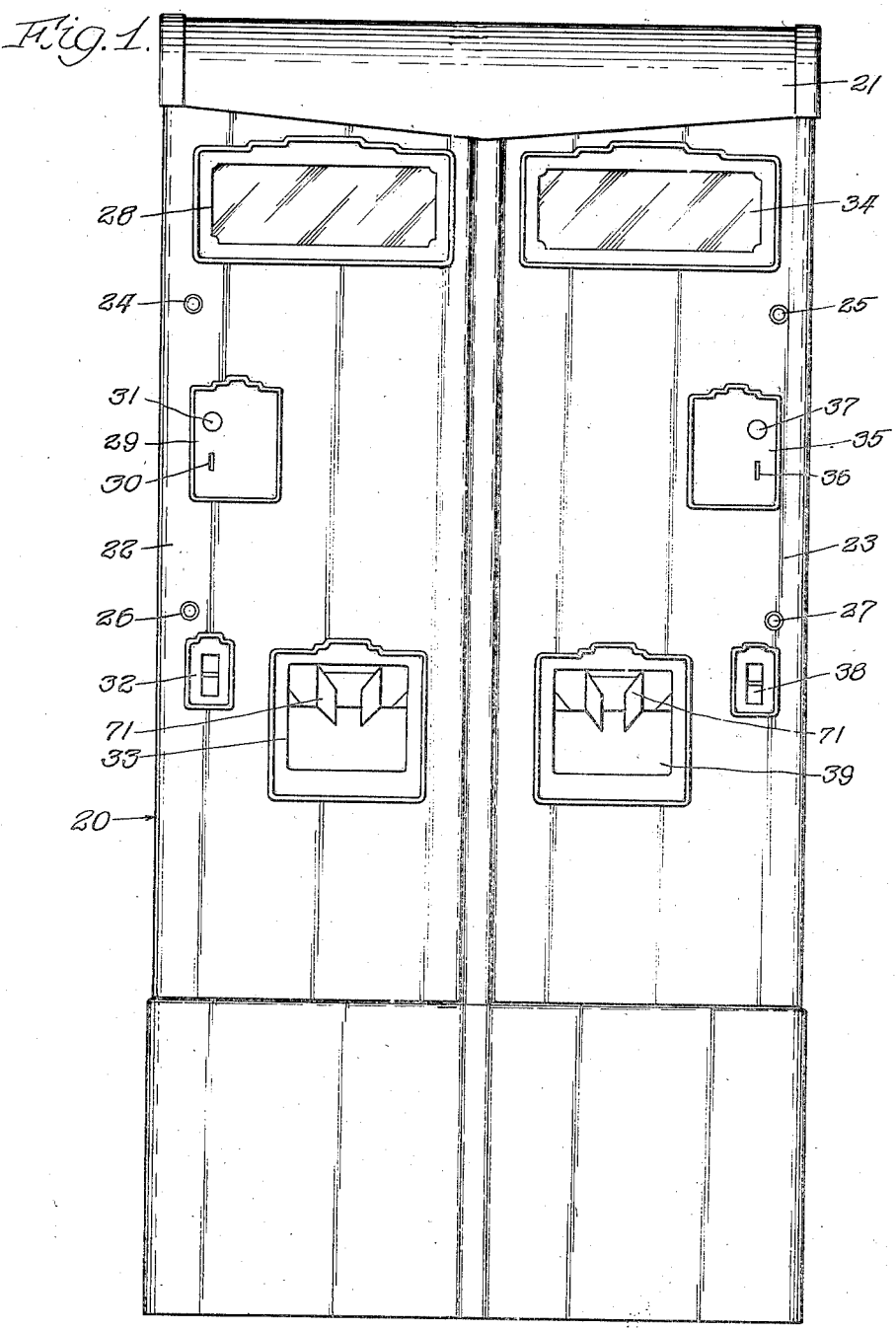

Jan. 22, 1952 L. ARNETT 2,583,461
BEVERAGE DISPENSING MACHINE
Filed Aug. 28, 1946 6 Sheets-Sheet 1

Inventor:
Leslie Arnett,
By Chritton, Schroeder, Merriam & Hofgren,
Attys.

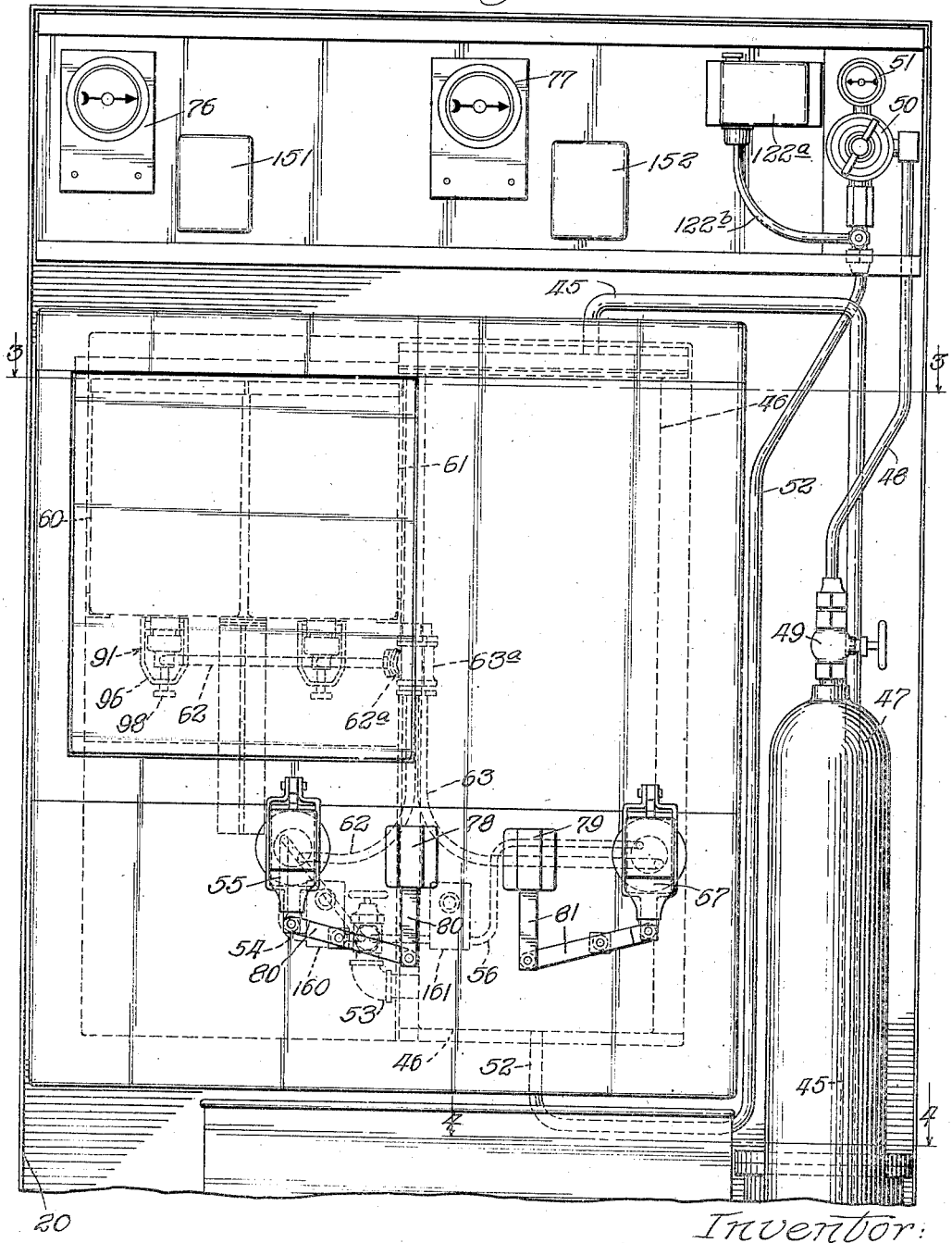

Jan. 22, 1952
L. ARNETT
2,583,461
BEVERAGE DISPENSING MACHINE
Filed Aug. 28, 1946
6 Sheets-Sheet 3
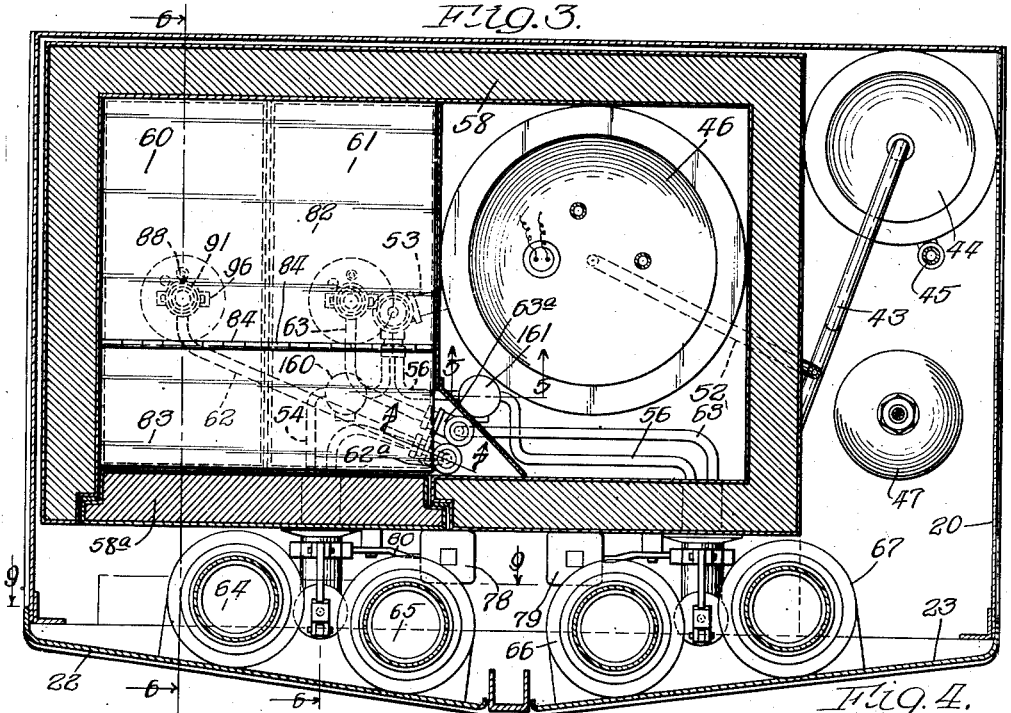
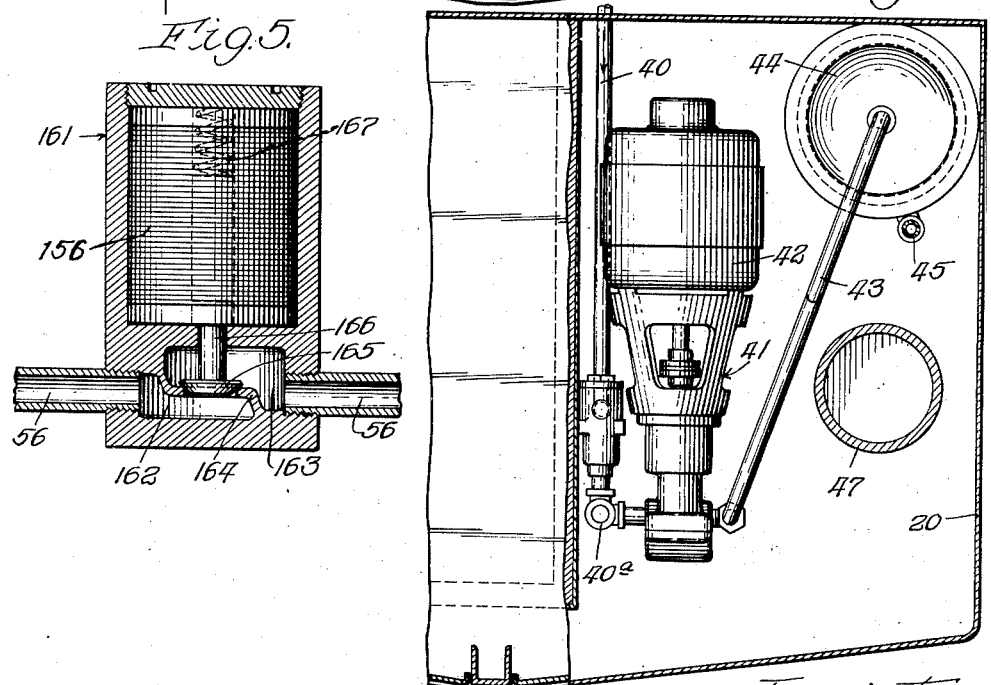
Inventor
Leslie Arnett,
By Chritten, Schroeder, Merriam & Hofgren, Attys.

Jan. 22, 1952
L. ARNETT
2,583,461
BEVERAGE DISPENSING MACHINE
Filed Aug. 28, 1946
6 Sheets-Sheet 4
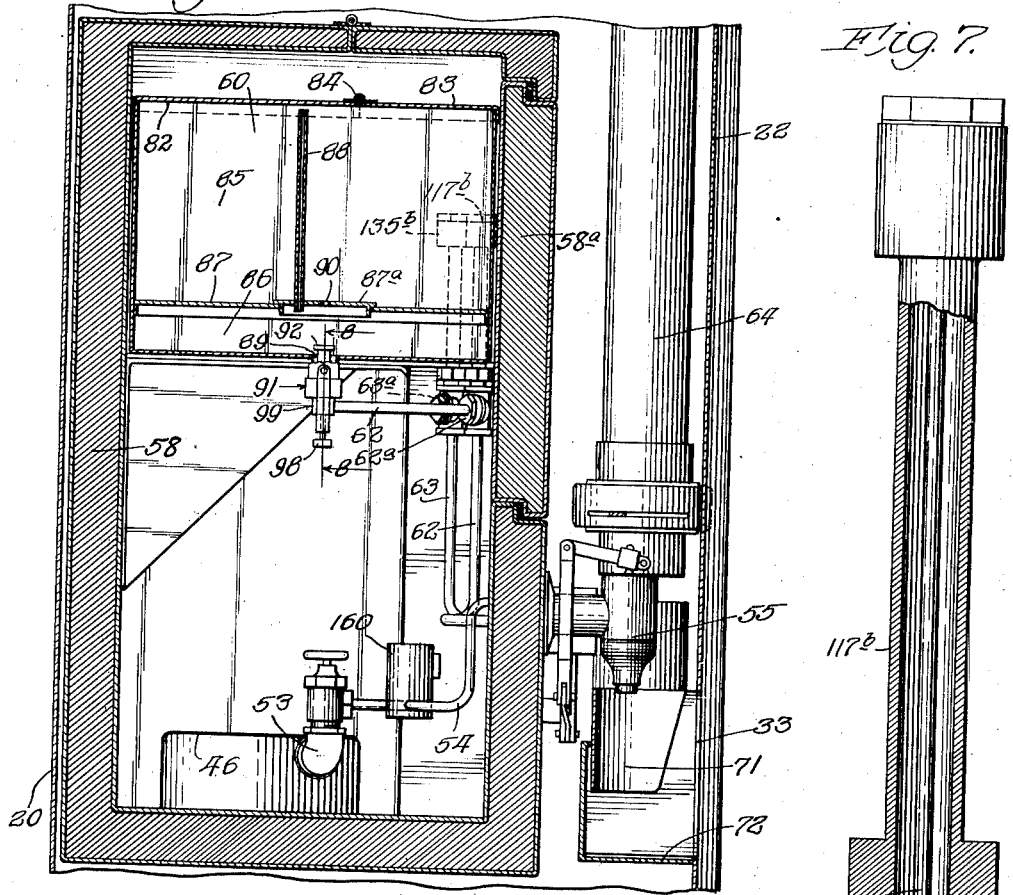
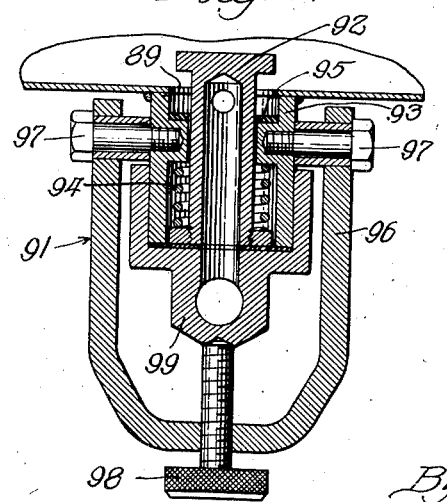
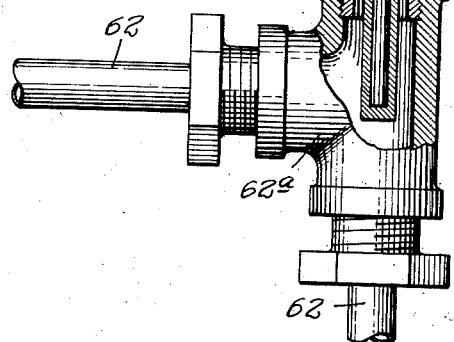
Inventor:
Leslie Arnett,
By Chritton, Schroeder, Merriam & Hofgren,
Attys.

Jan. 22, 1952  L. ARNETT  2,583,461
BEVERAGE DISPENSING MACHINE
Filed Aug. 28, 1946  6 Sheets-Sheet 5

Inventor:
Leslie Arnett,
By Clinton, Schroeder, Merriam & Hoffman,
Attys.

Jan. 22, 1952     L. ARNETT     2,583,461
BEVERAGE DISPENSING MACHINE
Filed Aug. 28, 1946     6 Sheets-Sheet 6
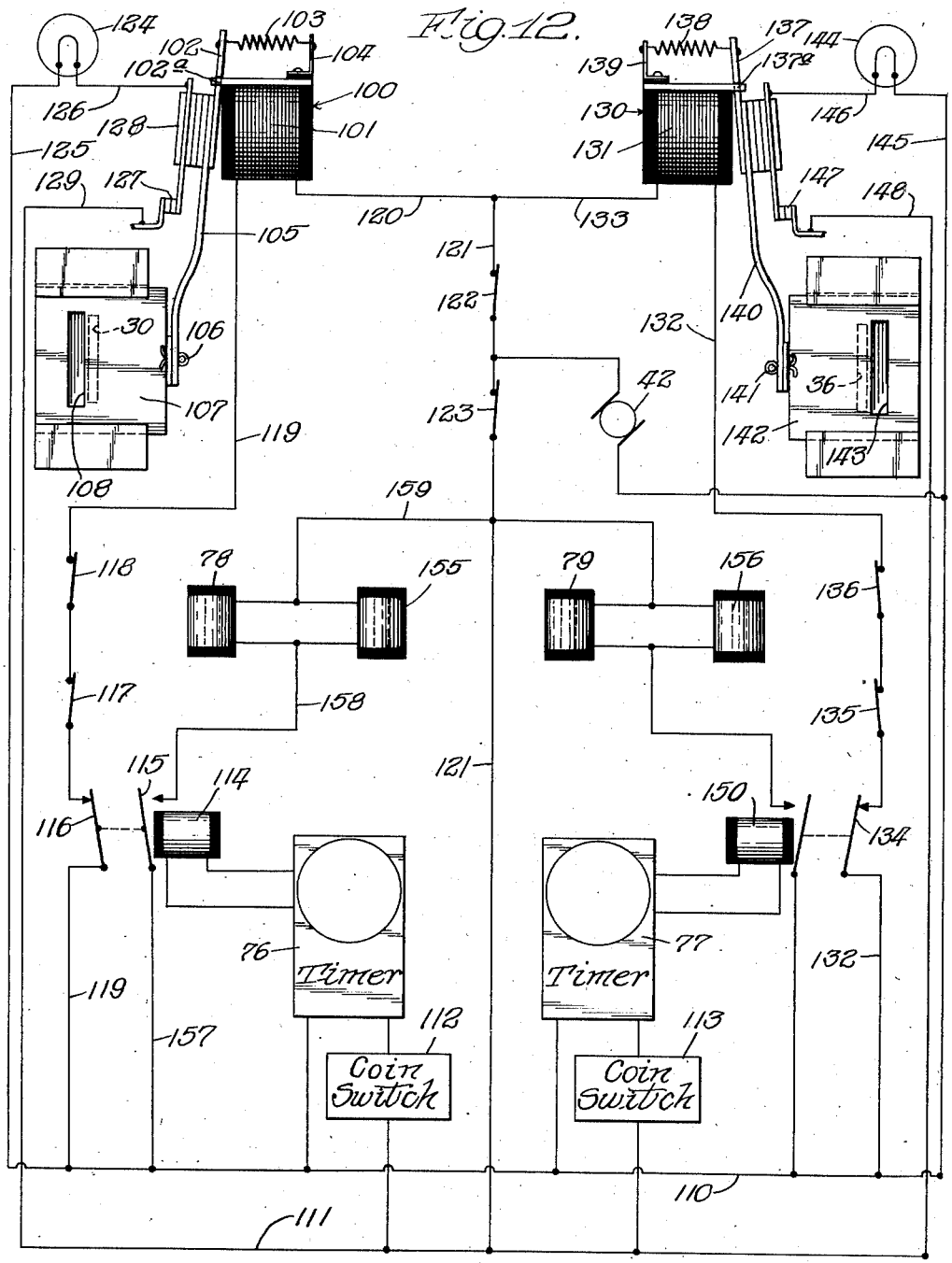

Patented Jan. 22, 1952

2,583,461

UNITED STATES PATENT OFFICE 2,583,461

BEVERAGE DISPENSING MACHINE

Leslie Arnett, Chicago, Ill., assignor, by direct and mesne assignments, of one-half to Square Manufacturing Company and one-half to ABC Vending Corporation, New York, N. Y., a corporation of Delaware Application August 28, 1946, Serial No. 693,428

4 Claims. (Cl. 225—21)

1

This invention relates to beverage dispensing machines, and more particularly to coin operated machines for dispensing beverages in bulk, as for example a machine of the character shown in my copending application Serial No. D. 132,288, filed August 5, 1946, now Patent No. D. 150,916, issued September 14, 1948.

The type of beverage dispensing machine to which the present invention relates is designed to prepare and dispense drinks by mixing a flavoring syrup or extract with carbonated water, and dispensing said drink in bulk. The term "bulk" is used to distinguish the type of machine which dispenses beverages in a paper cup or the like from the type of machine which merely delivers a package or bottle of such beverage, such package or bottle having been filled in advance.

Machines of the type referred to here may find advantageous use in theaters, other recreational areas, manufacturing plants, and other places where a large number of people are likely to congregate. In order for such machines to operate efficiently it is desirable that they be capable of rapidly dispensing a large quantity of properly cooled beverage. It is further desirable that such machines include means assuring accurate measurement of the quantity of the ingredients of beverage delivered, and protective means to prevent the machine from continuously running in the event of failure of certain of the parts, and to prevent the customer from attempting to utilize the machine when it is not in operating condition, as when the machine is completing one of its cycles, when the supply of cups approaches exhaustion, when the supply of any of the beverage ingredients (as syrup, carbon dioxide, or water) fails, or when the power supply to said machine fails or is disconnected.

I have devised and am here disclosing and claiming an improved beverage dispensing machine adapted to automatically deliver the desired one of two separate types of beverage, said machine having improved syrup containers, such improved containers including means assuring that the proper quantity of syrup is delivered when the machine is operated, and said containers having self-closing valves which allow the containers to be readily removed from the machine while preventing syrup from the containers from dropping upon other parts of the machine. My beverage dispensing machine also includes an improved coin blocking arrangement which is operative upon failure of certain parts of the system and which will prevent the potential customer from operating the machine when

2 it is not in condition to deliver a beverage. My improved machine also includes protective means in the water line to protect the machine from continuously running in the event of failure of certain parts of the system. Claims to the mechanical features of my improved machine will be found herein, while claims to a control circuit arrangement for such a beverage dispensing machine will be found in my co-pending application for a "Dispensing Machine Control Circuit," filed July 19, 1947, as Serial No. 762,107.

Figure 9:
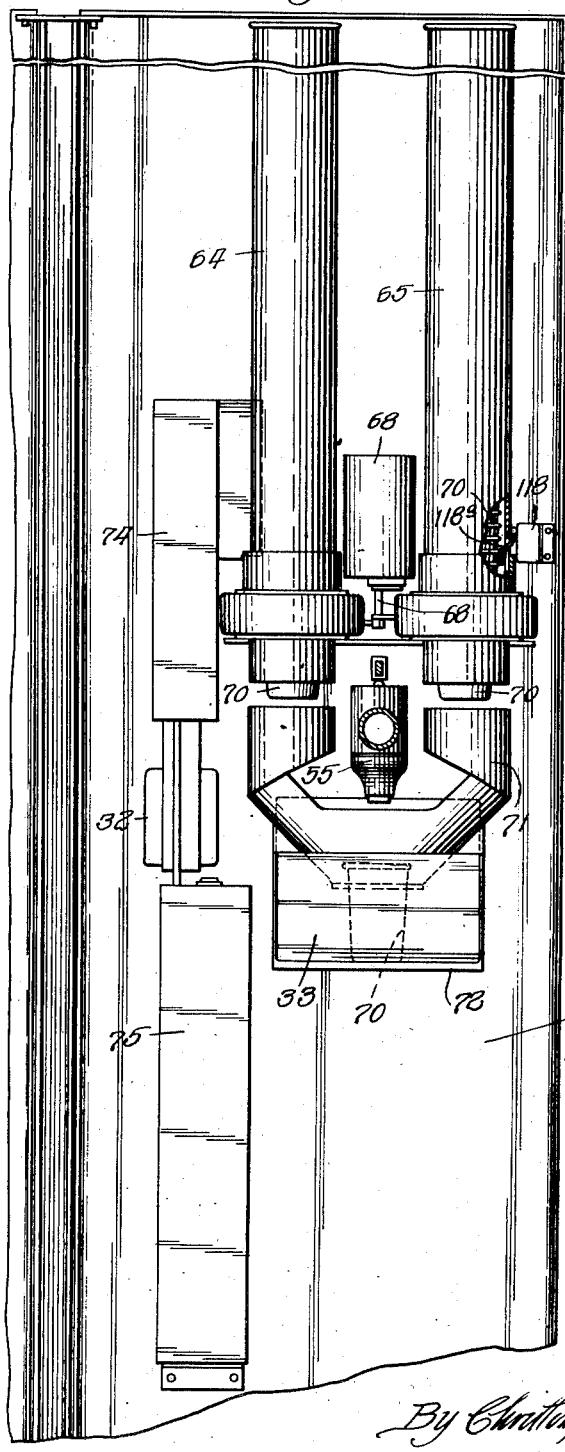
Figure 10:
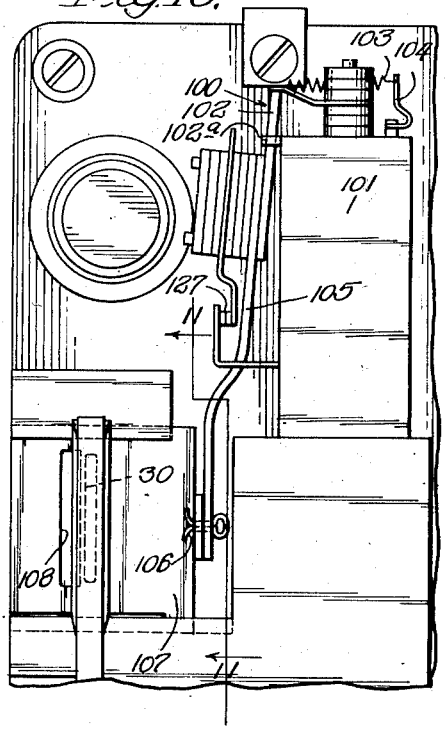
Figure 11:
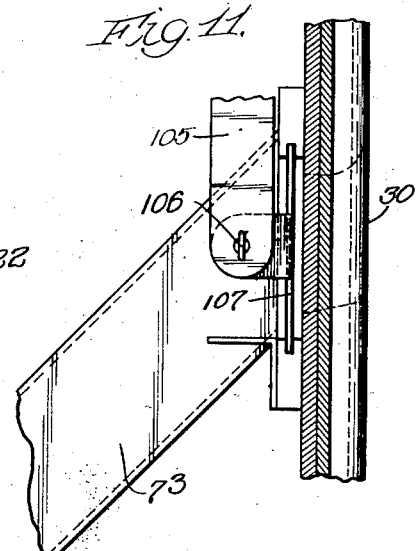

The foregoing and other features and advantages will be aparent from the following specification and the drawings, in which:

Figure 1 is a front elevation of a beverage dispensing machine including my inventions and adapted to deliver two separate types of beverage; Figure 2 is an enlarged fragmentary front view, partly in section, of the upper portion of the machine shown in Figure 1, with the doors removed; Figure 3 is a horizontal section taken on the line 3—3 of Figure 2 with a portion of the cup supporting and cup operating mechanism removed; Figure 4 is a fragmentary horizontal section taken on the line 4—4 of Figure 2; Figure 5 is a sectional view of the solenoid valve in one of the water lines taken on the line 5—5 of Figure 3; Figure 6 is a vertical sectional view through my improved syrup container, taken on the line 6—6 of Figure 3 with a portion of the cup supporting and cup operating mechanism removed; Figure 7 is a section through a portion of one of the syrup lines, taken on the line 7—7 of Figure 3, and showing the coin blocking switch actuating electrode in such line; Figure 8 is a vertical sectional view taken on the line 8—8 of Figure 6, through the self-closing valve of one of the syrup containers; Figure 9 is a fragmentary view of the back of one of the doors of the machine, taken on the line 9—9 of Figure 3, and showing one of the cup magazines, with a portion broken away to illustrate the action of the coin blocking cup switch; Figure 10 is a fragmentary view of the coin blocking mechanism; Figure 11 is a vertical section showing a portion of one of the coin chutes taken on line 11—11 of Figure 10; and Figure 12 is a diagrammatic representation of the wiring of the power supply for such machine.

Referring now to the drawings, a front elevation of a machine including my inventions is shown in Figure 1. The particular machine illustrated is adapted to dispense two different types of beverages, and comprises a cabinet indicated generally at 20, such cabinet having an overhanging hood or shade 21 at the top thereof, said shade being adapted to house one or more electric lamps for the purpose of illuminating the front of the machine. Two doors 22 and 23 are each adapted to open toward the center of such machine, such doors being held in closed position by means of the locks 24, 25, 26 and 27. The front of the door 22 includes a panel 28 adapted to hold advertising matter such as the name of the drink dispensed by the left portion (as shown in the drawings) of the machine, a coin panel 29 having a coin slot 30 and an indicating device 31 designed to indicate to the customer when the left portion of the machine is not in condition to dispense a beverage. A coin return 32 is also mounted on said door, and the drinks are dispensed through the opening 33. Similarly the door 23 includes the advertising panel 34, the coin panel 35 with its coin slot 36 and indicating device 37, the coin return 38 and the drink dispensing opening 39.

The general principle of operation of such a machine is conventional and will be described only briefly here since machines operating on this general principle are well known in the art. Generally, the machine receives a supply of water from the local standard supply, such water is delivered through a pump at the desired pressure, is purified, and is carbonated and cooled in the machine. A supply of syrup or extract of each of the beverages dispensed is carried by the machine, and when a coin is admitted into the machine through one of the coin slots it causes the machine to initiate a cycle of operation which includes delivering a desired quantity of carbonated water and syrup to a cup which the machine has caused to be released at the proper time onto a platform in one of the openings 33 or 39 where it is available to the consumer.

The means by which these operations are accomplished are shown in Figures 2, 3, 4, 6 and 9, and reference will now be had to such figures to disclose the general operation of the machine. The water to be used in the machine is supplied from the standard local supply through the pipe 40 as shown in Figure 4. A pump 41 driven by the motor 42 passes such water into the pipe 43 where it is delivered to the purifier 44 so that sediment and other impurities may be removed. After purifying, the water passes through the pipe 45 (see Figure 2) and is delivered to the carbonating and cooling means 46, which may be a carbonator-cooler of the character described in my copending application Serial No. 689,284, filed August 8, 1946, now Patent No. 2,519,533 issued August 22, 1950.

A supply of carbon dioxide is also delivered to such carbonator-cooler to be mixed with the water. A regular commercial cylinder of such gas is shown at 47 in Figures 2, 3 and 4. The carbon dioxide leaves such cylinder through the pipe 48, flowing from such cylinder when the valve 49 is opened after installation of the cylinder, and such gas is passed through the pressure reducing and regulating means 50 having an associated pressure gauge 51, and enters the carbonator-cooler through the pipe 52. In the carbonator-cooler the water is carbonated and cooled, as in the manner disclosed in my copending application above referred to. Since the cooling means are conventional in such machines, such cooling means are not illustrated in this specification, it being understood that the water may be carbonated and cooled in any conventional manner.

Figures 2 and 3 show the outlet pipe 53 from such carbonator-cooler, the carbonated water being then divided into two channels, one channel proceeding through the delivery pipe 54 to the mixing faucet 55 on the left side (as shown in the drawings) of the machine, and the other channel proceeding through the delivery pipe 56 to the mixing faucet 57 on the right side of the machine. The carbonator-cooler and syrup containers are enclosed in a housing 58 of insulating material, such housing having a removable portion or door 58a to provide access to certain parts of the apparatus.

A supply of syrup for said machine is held in the two syrup containers 60 and 61, and a different type of syrup or extract may be held in each container. The syrup may be drawn from the tank 60 through the pipe 62 to the mixing faucet 55 where it is mixed with the carbonated water to form one of the beverages to be dispensed. Similarly syrup from the container 61 may be drawn through the pipe 63 to the mixing faucet 57 where it is mixed with the carbonated water to form the other beverage to be dispensed.

A supply of cups is contained within the magazine comprising the sections 64 and 65 on the left side of the machine and the magazine comprising the sections 66 and 67 on the right side of said machine. These cup magazines are of conventional construction, and may be constructed in accordance with Lind U. S. Patent No. 1,746,597 for example. Each magazine is operated by a motor and operating mechanism as shown at 68, the arrangement being such that cups are delivered alternately from each section of the respective magazines, thereby doubling the supply of cups available. During the operating cycle of the machine the motor 68 and its associated mechanism causes a cup 70 to be released from one or the other sections of the associated cup magazine, and the cup slides down the cup guide 71 and comes to rest upon the platform 72 directly below the faucet 55. While it is in such position the cup is filled with a beverage and the cup may then be removed by the consumer through the opening 33.

A cycle of operation of said machine may be initiated by a coin which is admitted to the machine through the coin slot 30 and falls down a coin chute 73 into the conventional coin mechanism 74, where it operates a switch, thereby actuating a timer and causing a cycle of operation of said machine. The coin then continues into the till or coin box 75 where it may be removed when desired. In the event a slug or other improper coin is inserted in the machine it fails to actuate the aforementioned switch and is returned through the coin return mechanism 32. Since the coin mechanism of this machine is conventional and is well known to the art it will neither be described further nor illustrated in greater detail here.

The machine just generally described is adapted to deliver a measured quantity of either of two different types of beverages, and is completely automatic in its operation. Such machine has the further advantage of utilizing separate faucets for each of the beverages to be dispensed through different openings so that two cups of beverage may be dispensed by the machine at the same time. Furthermore the machine is adapted to deliver a large supply of beverage before any of the ingredients are exhausted, since it contains an efficient carbonator-cooler of the character described in my earlier mentioned copending application, a relatively large supply of syrup, and a comparatively great number of cups. My present invention comprises certain improvements to said machine to further increase its effectiveness of operation.

I have devised an improved syrup container for such a machine, and while the detailed description below will refer only to the syrup container 60 it will be understood that the syrup container 61 is of identical construction. The amount of syrup delivered to one of the dual openings in the respective faucets during each cycle of operation of the machine is controlled by the timers 76 and 77, timer 76 being operatively associated with the left portion of the machine and timer 77 being operatively associated with the right portion of the machine. Each such timer is set to regulate the time of operation of the respective faucets, which faucets are respectively controlled by solenoids 78 and 79 and the operating levers 80 and 81, as shown in Figure 3. For example, if the timer 76 were set for three seconds, and the left portion of the machine were actuated by inserting a coin in the coin slot 30 the solenoid 78 would be actuated for a period of three seconds, and the lever system 80 would cause the faucet 55 to draw carbonated water and syrup, passing simultaneously through separate measuring orifices in the single faucet, for a period of three seconds.

Since the amount of syrup drawn is a function of time, it is essential that the pressure of said syrup be substantially constant. If such were not the case, if the syrup container 60 were full of syrup as indicated by the dotted line in Figure 6 the pressure of the syrup would be much greater than if the container were almost empty, and when the container was full a greater amount of syrup would be drawn off during each cycle of operation of the machine. I have devised a novel means of maintaining the pressure of syrup practically constant at all times, thereby insuring that substantially an equal quantity of syrup will be drawn each time the machine is operated.

Referring now to Figure 6, the syrup container 60 has a cover 82 including a portion 83 which is pivoted upon the hinge 84 thus allowing access to the inside of such container. The container is divided into an upper main chamber 85 and a lower auxiliary chamber 86 by means of the plate 87 which is soldered against the side walls of the container near the bottom thereof so that the main or upper chamber 85 has several times the volume of the auxiliary chamber 86. The plate 87 is fitted with a removable portion 87a so that access may be had to the auxiliary chamber for purposes of cleaning. A pipe 88 extends through the plate 87 from a point immediately below the bottom of said plate to a point near the cover 82 and above the normal level of syrup in the container. This pipe provides a means for communication of air between said chambers so that syrup may be readily supplied to the lower chamber from the upper chamber by means of gravity, and so that a partial vacuum will not form in the lower chamber when syrup is drawn from the bottom thereof. The bottom of the auxiliary chamber is provided with an outlet 89, and the plate 87 is provided with an opening 90, such opening comprising an inlet to the auxiliary chamber 86 from the main chamber 85, such inlet being of smaller capacity than the outlet 89.

When the container is filled with syrup, the syrup trickles down through the inlet 90 into the auxiliary chamber 86, and such container becomes filled with syrup. When the machine is operated syrup is drawn off through the outlet 89 and the pipe 62 faster than it can be replenished through the inlet 90. Consequently, the pressure of the syrup which is drawn off is only the pressure of the syrup in the auxiliary chamber, and is substantially independent of the pressure exerted by the syrup in the main chamber. Even if the machine is kept in almost constant operation this pressure will vary only slightly, since the auxiliary chamber 86 will be constantly replenished through the inlet 90 and thus kept full of syrup. Even if the syrup is drawn off slightly faster than it can be replenished through the inlet 90 its pressure will only vary by a small amount depending upon the change in position of the surface of the syrup in the auxiliary chamber, and in any event the pressure of the syrup will not depend upon the amount of syrup in the main chamber.

In the past in such beverage dispensing machines it has been necessary, when it was desired to remove the syrup container, to uncouple the syrup container from the outlet pipe and to permit the syrup to drip on to other portions of the machine until the container was removed from such machine. My improved syrup container is provided with a self-closing valve for the outlet thereof, such valve automatically closing before the syrup container can be removed from the machine. Such valve is shown generally in Figure 6 at 91, and is shown in greater detail in Figure 8. Referring to Figure 8 it will be seen that a valve member 92 extends from a valve housing 93 through the outlet 89 and up into the syrup container. The valve housing 93 is securely fastened by welding or other means to the bottom of the container around the outlet 89 to form a liquid-tight seal, and such housing carries a helical spring 94 which constantly urges or biases said valve to closed position, said valve being adapted to cooperate with the seat 95 and thereby close the outlet 89, since the housing 93 is secured to the container in a liquid-tight manner. A yoke 96 is pivotally carried by said valve housing by means of the bolts 97, said yoke depending below the valve housing and having in its lower portion a set screw 98. The outlet means, being the pipe 62 in the machine illustrated, carries on its extremity an actuating member 99, said actuating member being adapted to force the valve open against the pressure of the spring 94 when the container is in position in the machine. In the event it is desired to remove the container from the machine the set screw 98 is loosened so that the yoke 96 may be pivoted to one side. This removes support for the actuating member 99, and the valve automatically closes. The container may then be removed from the machine for purposes of cleaning or refilling, and during such removal any syrup or other liquid within the container will not drip from said container.

As indicated in the earlier portion of this specification it is desirable that such beverage dispensing machine be provided with a coin blocking arrangement which is operative on failure of certain parts of the system. It has been found that such machines often first exhaust the supply of cups, since it is impractical to supply the machine with enough cups to utilize all the syrup which may be held in a syrup container of substantial size, and since the supply of water is normally inexhaustible. Obviously it is desirable in such cases to prevent the machine from further operation as the consumer's nickel will be lost and the beverage will be wasted if there is not a cup to catch it when it is discharged from the faucet. It is further desirable to prevent such machine from receiving additional coins while the machine is in the course of a cycle of operation, as they would be lost to the consumer, and the additional advantages of providing a coin blocking arrangement operative in the event the syrup supply fails either through exhaustion or through sticky valves or clogged pipes, as well as in the event of a failure of carbon dioxide or water will be obvious. I have devised a coin blocking arrangement operative upon failure of any of these parts of the system or upon the failure of power to said machine, the coin blocking apparatus itself being shown in Figures 10 and 11 while Figure 12 illustrates a wiring diagram of the power supply for such an arrangement. Figure 7 shows a type of switch actuating electrode which may be advantageously used in the syrup and water lines to indicate failure of the supply, and Figure 9 shows a type of switch which I prefer to use to indicate that the cup supply is approaching exhaustion.

Referring now more particularly to Figures 10, 11 and 12, a relay 100 has an operating coil 101 and an armature 102 pivotally mounted at 102a. The armature is normally held in released position by means of the spring 103 which is mounted on the bracket 104 on top of the relay. The armature includes an extension 105 on the end of which is mounted by means of the cotter key 106 a coin blocking member or flag 107 having a slot 108 through which coins may pass. The blocking member 107 is arranged across the coin chute 73 just behind the coin slot 30, and slot 108 in such blocking member is so arranged that when the relay is released as shown in the drawings the slot 108 is out of alignment with the coin chute and the coin slot 30, thereby preventing coins from being admitted into the machine. In the event that the relay coil is actuated the armature is pulled to the right as shown in Figure 10 and the slot 108 is brought into alignment with the coin chute and the coin slot 30, thereby permitting coins to be admitted into the machine.

Figure 12 shows a circuit whereby this coin blocking arrangement may be operated in such a machine to prevent the admission of coins into said machine in the event that the supply of cups approaches exhaustion, in the event the machine is performing a cycle of operation, or in the event of a failure of syrup, carbon dioxide, water, or power. Since the supply of carbon dioxide and water is common to both beverage dispensing portions of the machine, the switches which operate the coin blocking arrangement in the event of failure of carbon dioxide or water are common to the circuits of both coin blocking mechanisms, and since there are separate cup and syrup supplies for each half of the machine, and since each portion of the machine performs its own separate cycle of operation, the switches controlling the operation of the coin blocking mechanism for these elements are separate. The circuit shown in Figure 12 is also designed to actuate the coin blocking arrangement on the machine in the event of power failure, and the circuit as shown assumes that both portions of the machine are properly supplied with cups, syrup, carbon dioxide and water, but that the machine is not connected to an external source of power.

In the drawings the line wires 110 and 111 are assumed to terminate in a plug, such as a conventional plug adapted to be inserted in a conventional wall socket, or to be adapted in some other way to be connected across a source of voltage. Such plug or other connection is not shown in the drawing. Coin switches 112 and 113 are of conventional construction such as are usually found in such machines, and are adapted upon the admittance of a proper coin into such machine to respectively actuate the timers 76 and 77. Actuation of timer 76 causes a circuit to be completed through the relay coil 114, thus closing the normally open contacts 115 and opening the normally closed contacts 116, and the relay will remain energized until the completion of the cycle of said machine, at which time the relay will be released and the contacts will return to the positions shown in the drawing. The contacts 116 thus comprise a cycle switch for one portion of the machine, and such contacts, together with the syrup switch 117 and the cup switch 118 are in series in the wire 119 with the relay coil 101 of the coin blocking mechanism for the left portion of the machine, such relay coil being returned to the wire 111 by means of the leads 120 and 121. The carbon dioxide switch 122 and the water switch 123 are inserted in series in the lead 121.

Thus it will be seen that if the wires 110 and 111 are connected across a source of voltage a circuit will be completed from the wire 110 through the lead 119, including the switches 116, 117 and 118, through the relay coil 101 and the leads 120 and 121 (including the switches 122 and 123) back to the wire 111. In such event the relay coil 101 will become energized, pulling the armature 102 against the coil, and causing the slot 108 in the coin blocking member 107 to move into alignment with the coin chute and the coin slot, thus permitting a coin to be admitted into the machine.

It will be readily seen that should any one of the switches 116, 117, 118, 122 or 123 be open, or should the power available through the leads 110 and 111 fail, the relay coil 101 will be deenergized and the slot 108 will move back to the position shown in the drawings and will prevent the admission of a coin into the machine. Furthermore, reference to Figure 12 will show that when the coin slot is blocked the lamp 124 will be connected across the source of power, and the lamp will be illuminated. Such connection is obtained by means of the lead 125 which runs from the wire 110 to one side of the lamp, the lead 126 which runs from the other side of the lamp to a contact 127 which is mounted in an insulated block 128 carried by the armature 102, and by means of the lead 129 which runs from the other side of said contact back to the wire 111. It will be noted that the contact 127 is closed when the coin chute is blocked, and the lamp is therefore illuminated when the coin chute is blocked. Said lamp is adapted to be mounted behind the indicating device 26 shown in Figure 1, and is adapted to illuminate such device when the coin chute is blocked in order to indicate to the consumer that this portion of the machine is out of operation.

The coin blocking arrangement for the right portion of the machine is shown in the right half of Figure 12. A relay 130 having an operating coil 131 is included in a circuit across the wires 110 and 111, said circuit including the lead 132, said relay coil, the lead 133, and the lead 121.

The lead 121 and the switches 122 and 123 are common to the circuits of both coin blocking relays, and the lead 132 includes the cycle switch 134, the syrup switch 135, and the cup switch 136.

As heretofore described, when all the switches are closed as shown in the drawing and when the line wires 110 and 111 are connected across a voltage supply the relay coil 131 becomes energized. Said relay includes an armature 137 which is pivotally mounted at 137a and is held away from the relay coil when said coil is deenergized by means of the spring 138 mounted on the bracket 139. The armature has an extension 140 at the end of which is mounted, by means of the cotter key 141, the coin blocking member or flag 142 having a slot 143 adapted to admit coins. When said relay is energized the slot 143 is in alignment with the coin chute and the coin slot 36 so that a coin may be admitted to the machine. When the relay is released as shown in the drawings the slot 143 is out of alignment with the coin slot 36 thus blocking coins from being admitted to the machine. An indicating lamp 144 is adapted to illuminate the indicating device 27 shown in Figure 1 when the relay 130 is released, said lamp being connected across the line wires by means of the leads 145 and 146, the contact 147, and the lead 148.

While any conventional types of switches may be used to indicate the failure of syrup, water, cups, or carbon dioxide, I have found it desirable to use switches of the type which will be hereafter described. As pointed out earlier the cycle switch 116 comprises normally closed contacts of the relay 114, said relay being energized and the switch opened as a function of the timer 76. Similarly the cycle switch 134 for the right portion of the machine comprises normally closed contacts of the relay 150, which relay is energized during a cycle of the right portion of the machine as a function of the timer 77.

The switches 117 and 135 are the syrup switches, and are closed when the machine is supplied with syrup. However, should the supply of syrup fail, such switches are designed to automatically open. For this purpose I have utilized conventional switches respectively actuated by a single electrode in each syrup line, which switches may be of the type manufactured by B/W Controller Corporation.

The electrode which actuates the switch 117 which is utilized in combination with the syrup container 60 is shown in detail in Figure 7. Since such type of switch operation is conventional it will be described only briefly as comprising an electrode 117a which is mounted in an electrode holder 117b, said electrode holder in turn being mounted in an elbow 62a in the syrup line 62. Such control is so designed that a current normally flows through the liquid in the syrup line from the electrode to ground, and in the event that the syrup fails this current is shut off, actuating a relay which is contained in the box 151 (Figure 2), and this relay serves to open the switch 117. Similarly the control which operates switch 135 comprises an electrode which is mounted in the electrode holder 135b, such electrode holder being in turn mounted in an elbow 63a in the syrup line 63 which leads from the syrup container 61. Such electrode is operatively associated with a relay mounted in the box 152 and operates in the same manner as the switch 117.

The switch 123 is shown diagrammatically in Figure 12, and is actuated by a similar electrode mounted in an elbow 40a in the water line at a point just prior to where said water line enters the water pump, as shown in Figure 4. Such a construction enables the switch 123 to also act as a safety switch for the pump motor 42, said switch being in series in one side of the line to said pump motor, as shown in Figure 12. In the event of a failure of the water supply, switch 123 opens, thus opening the circuit to the coin blocking mechanism and the pump motor, which prevents the pump running while dry.

The carbon dioxide switch shown diagrammatically at 122 in Figure 12, and which, as is the water switch, is common to the circuits of both coin blocking relays, comprises a conventional pressure-actuated switch in the carbon dioxide line. Said switch is shown in block form at 122a in Figure 2, and is connected to said carbon dioxide line by means of the tube or pipe 122b. The switch is conventional and is available commercially and will not be described further here except to say that when the carbon dioxide pressure goes below a certain desired minimum the switch 122 is caused to open, thereby releasing both coin blocking relays and causing both coin chutes to be blocked.

The switches 118 and 136 as shown in Figure 12 comprise normally closed cup switches such as the conventional micro-switch shown at 118 in Figure 9. One of such switches is mounted on one of the sections of each of the two cup magazines, and each switch has an actuating arm such as the arm 118a, which arm contacts the cups within the magazine. When the supply of cups approaches exhaustion and the last cup passes beneath the arm 118a a spring urges the arm to the left and the switch is opened, thus breaking the circuit to the coin blocking relay on one side of the machine.

Referring again to Figure 12, the solenoids 78 and 79 which operate the respective faucets 55 and 57 (see Figures 2 and 3) are shown in diagrammatic form, and each of said solenoids is connected in the circuit in parallel with the solenoids 155 and 156 respectively. If a coin is admitted into the left side of the machine, the coin switch 112 will cause the timer 76 to initiate a cycle of operation of said machine, and the relay coil 114 will become energized in the manner heretofore described. Such energization will close the normally open contacts 115 and complete a circuit from line wire 110 through lead 157, contact 115, lead 158, solenoids 78 and 155 in parallel, and leads 159 and 121 back to line wire 111. Energization of solenoid 78 will cause the faucet 55 to open to draw carbonated water from the carbonator-cooler 46 and syrup from the container 60 so that a beverage is delivered.

It oftens happens that the faucet valve sticks or jams open. In such event the water would not shut off, but would flow in a stream from the faucet 55.

In order to guard against such contingency I provide a solenoid valve in the water line to each of the faucets, the operating solenoids for each of such valves being shown diagrammatically in Figure 12 at 155 and 156 respectively. As will be seen from an inspection of Figure 12 energization of each of the solenoids 155 and 156 is a function of the respective timers 76 and 77, and is entirely independent from the solenoids 78 and 79 which control the respective faucets. Therefore, if the valve in one of the faucets jams open, the solenoid 155 or 156 as the case may be will still become deenergized upon the completion of the normal cycle of operation of the machine. Deenergization of such solenoid will close a valve and shut off the supply of water to such faucet.

The mechanical construction of this apparatus is shown at Figures 3 and 5 where the solenoid valve 160 is inserted in the water line 54 which supplies the faucet 55, and the solenoid valve 161 is inserted in the water line 56 which supplies the faucet 57. The construction of the solenoid valve 161 is shown in Figure 5. The valve housing 161 is adapted to be inserted in the water line and includes a chamber 162 and a chamber 163, said chambers being separated by a partition 164 having an opening adapted to provide a valve seat for the valve 165 which is mounted on the valve stem 166. A spring 167 at the top (as shown in drawing) of the housing urges the valve 165 to closed position, and the solenoid 156 surrounds such valve stem which is made of soft iron or other permeable material. Thus it will be seen that the valve is normally closed, and consequently the water supply from the carbonator-cooler to the faucet is normally shut off. However, the solenoid 156 is energized during a normal cycle of operation of the machine, and only during such cycle is the valve 165 opened and water allowed to flow to the faucet.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a beverage dispensing machine having means for mixing syrup and water, a syrup container of the character described, including: an upper syrup chamber; a lower syrup chamber, said upper chamber having a volume several times greater than said lower chamber; a plate separating said chambers, said plate having a movable portion for providing access to said lower chamber, and having an opening therein comprising an inlet for supplying syrup to said lower chamber from said upper chamber; pipe means for providing communication of air between said chambers; and a valved outlet for drawing syrup from said lower chamber, said outlet having a capacity greater than the capacity of said inlet.

2. Apparatus of the character claimed in claim 1, wherein said container is removable, and said outlet includes a valve which automatically opens when said container is in place and operatively connected in the machine, and automatically closes when said container is removed, a yoke for holding said valve in open position, and a set screw for locking said yoke in operable relation with said valve.

3. In a beverage dispensing machine having means for mixing syrup and water, apparatus of the character described, including: a removable syrup container having an outlet in one wall; pipe means adapted to carry syrup from said outlet; an actuating member carried by said pipe means; valve means carried by said container and cooperating with said outlet, said valve means being biased to normally close said outlet, and being adapted to be held open by said actuating member when the pipe is connected in operative relation to said outlet and means for locking said actuating member in engagement with said valve.

4. In a beverage dispensing machine having means for mixing syrup and water, apparatus of the character described, including: a removable syrup container comprising an upper syrup chamber, a lower syrup chamber having an outlet in one wall, and a member separating said chambers, said member having an opening therein comprising an inlet for supplying syrup to said lower chamber from said upper chamber, and said outlet having a greater capacity than said inlet; pipe means adapted to carry syrup from said outlet; an actuating member carried by said pipe means; valve means carried by said container and cooperating with said outlet, said valve means being biased to normally close said outlet, and being adapted to be held open by said actuating member; and a yoke member carried by said valve means and adapted to complete a connection with said pipe means and cause said actuating member to hold said valve means open.

LESLIE ARNETT.

REFERENCES CITED

The following references are of record in the file of this patent:

UNITED STATES PATENTS

| Number | Name | Date |
|---|---|---|
| 1,241,532 | Doering et al. | Sept. 25, 1917 |
| 1,373,914 | Samuelson | Apr. 25, 1921 |
| 1,520,664 | Walters et al. | Dec. 23, 1924 |
| 1,536,854 | Holderele et al. | May 5, 1925 |
| 1,639,679 | Zsoldos | Aug. 23, 1927 |

FOREIGN PATENTS

| Number | Country | Date |
|---|---|---|
| 261,342 | Italy | Nov. 23, 1928 |